(No Model.)

C. CLAUDY & J. KLUSMEYER.
BELT FASTENER.

No. 529,364. Patented Nov. 20, 1894.

Witnesses
R. A. McAdory
A. Stan

Inventors
Christian Claudy
John Klusmeyer
By their Attorney P. Byrne

UNITED STATES PATENT OFFICE.

CHRISTIAN CLAUDY AND JOHN KLUSMEYER, OF BIRMINGHAM, ALABAMA; SAID CLAUDY ASSIGNOR TO AUGUSTA L. POE, OF SAME PLACE.

BELT-FASTENER.

SPECIFICATION forming part of Letters Patent No. 529,364, dated November 20, 1894.

Application filed January 30, 1894. Renewed October 13, 1894. Serial No. 525,847. (No model.)

*To all whom it may concern:*

Be it known that we, CHRISTIAN CLAUDY and JOHN KLUSMEYER, citizens of the United States, and residents of Birmingham, in the county of Jefferson and State of Alabama, have invented certain new and useful Improvements in Belt-Fasteners; and we do hereby declare the following to be a full, clear, and exact description of the invention, such as will enable others skilled in the art to which it appertains to make and use the same.

Our invention relates to improvements in that class of devices used to fasten, or attach the ends of a belt together for driving machinery, and known as a belt fastener; and the objects of our improvement are, first, to provide a metallic belt fastener that will be simple and cheap to construct, which can be quickly and easily attached to the belt without requiring tools of any kind to make the attachment; second, to provide a metallic belt fastener that can be attached to a belt without requiring holes to be made in the belting, and if the belt becomes slack when using, it can be taken up without delay by simply slipping one end of the belt a little farther through the fastener, thereby making a big saving in time over the usual method of taking up a belt secured by lacings, or other devices now in use for securing belts together. We attain these objects by the device and method of attaching the belt illustrated in the accompanying drawings, in which—

Figure 1:
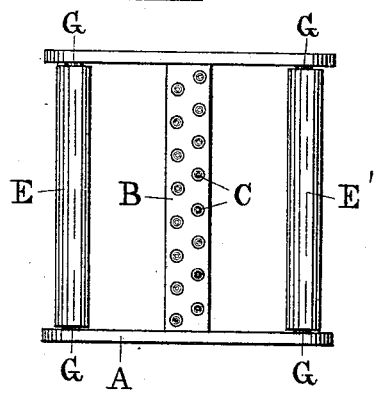
Figure 2:
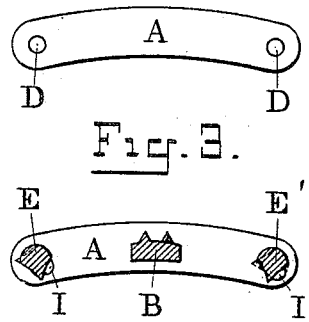
Figure 3:
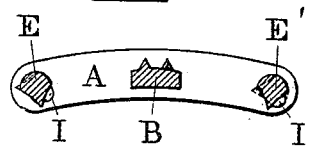
Figure 4:
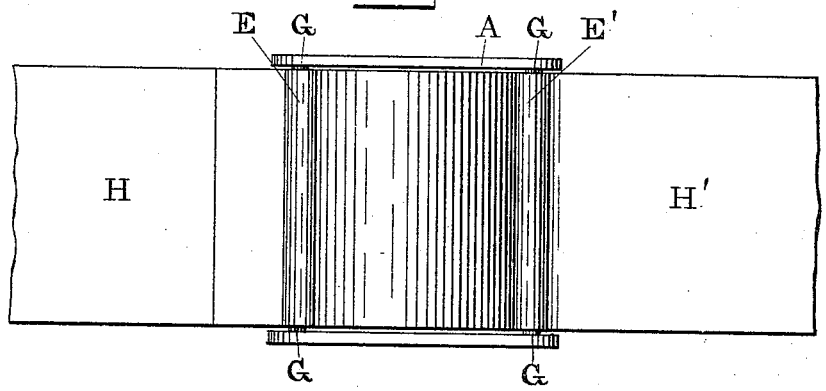
Figure 5:
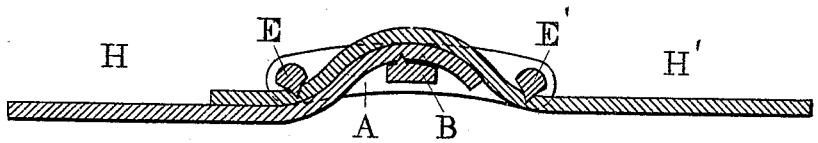

Figure 1 is a top view of our improved belt fastener. Fig. 2, is a side view of the same. Fig. 3, is a sectional view through the center of Fig. 1. Fig. 4, is a top view of the belt fastener, with the ends of a belt fastened in the device. Fig. 5, is a sectional view through the center of the same.

Similar letters refer to similar parts throughout the several views.

The frame A of the belt fastener is made of malleable iron, or any other suitable metallic substance. It is provided in the center with a cross bar B, the cross bar having a series of one or more rows of pins C to engage the belt. The sides of the frame are provided with holes D. D near the ends to journal end bars in. The end bars E. E' are made of malleable iron, drop forged steel, or other suitable metallic material. The end bars are provided with a series of pins F on one side and have journals formed on the ends to attach them to the side frames. The end bars turn in the side frames on their journals as shown by dotted lines in sectional Fig. 3, to permit the belt to enter without interference from the pins.

To attach the ends of the belt H. H' to the fastener, the end H is passed under one of the end bars E and over the cross bar B, on which it is pressed down to engage the pins as shown in sectional view Fig. 5. The remaining end of the belt, is passed under the end bar E' over the belt on the cross bar B and under the end bar E, when both bars are turned down to engage the points of the pins, the belt when strained revolving the end bars until they rest against the stops I. I provided on the side frames, the stops preventing the end bars turning the points of the pins beyond a vertical position.

To shorten or take up the belt at any time, it is only necessary to draw the end of the belt H' through the fastener the required distance, turn the end bars down to engage the pins in the belt, when the belt is immediately ready for operation again, with almost no loss of time in making the adjustment.

Having thus described our invention, what we claim as new, and desire to secure by Letters Patent, is—

1. In a belt fastener, a metallic frame having a cross bar with a series of one or more rows of pins, two end bars journaled in the frame, the bars having a series of pins on one side, stops formed on the side frames to prevent the pins on the end bars from turning past a vertical position, substantially as described.

2. In a belt fastener, a metallic frame having a cross bar with a series of pins, end bars journaled in the frame the bars provided with a series of pins, one end of a belt engaging the pins on a cross bar, the other end of the belt engaging the pins on the end bars, all combined as set forth for the purpose described.

In testimony whereof we affix our signatures in presence of two witnesses.

CHRISTIAN CLAUDY.
JOHN KLUSMEYER.

Witnesses:
I. C. BEATTY,
D. C. BUCKSHAW.